(12) United States Patent
Winger et al.

(10) Patent No.: US 10,998,595 B2
(45) Date of Patent: May 4, 2021

(54) MODULAR VEHICLE BATTERY

(71) Applicant: GM Global Technology Operations LLC, Detroit, MI (US)

(72) Inventors: Lyall K. Winger, Waterloo (CA); Dave G. Rich, Sterling Heights, MI (US); Saad Hasan, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 300 days.

(21) Appl. No.: 16/184,126

(22) Filed: Nov. 8, 2018

(65) Prior Publication Data
US 2020/0152938 A1 May 14, 2020

(51) Int. Cl.
| | |
|---|---|
| *H01M 50/20* | (2021.01) |
| *B60L 58/19* | (2019.01) |
| *B60L 58/26* | (2019.01) |
| *H01M 50/40* | (2021.01) |
| *H01M 50/528* | (2021.01) |
| *H01M 10/613* | (2014.01) |
| *H01M 10/48* | (2006.01) |

(52) U.S. Cl.
CPC .............. *H01M 50/20* (2021.01); *B60L 58/19* (2019.02); *B60L 58/26* (2019.02); *H01M 50/40* (2021.01); *H01M 50/528* (2021.01); *H01M 10/486* (2013.01); *H01M 10/613* (2015.04)

(58) Field of Classification Search
CPC ............. H01M 2/1077; H01M 2/1083; H01M 10/613; B60L 58/19; B60L 58/26
See application file for complete search history.

(56) References Cited

U.S. PATENT DOCUMENTS

| | | | | |
|---|---|---|---|---|
| 6,140,799 | A * | 10/2000 | Thomasson ........... | H02J 7/0024 320/117 |
| 9,673,431 | B2 * | 6/2017 | Despesse ........... | H01M 10/4207 |
| 2010/0285347 | A1 * | 11/2010 | Saito ................... | H01M 2/1077 429/120 |
| 2011/0293974 | A1 * | 12/2011 | Yoon .................. | H01M 10/0413 429/72 |
| 2014/0308551 | A1 * | 10/2014 | Schroeder ......... | H01M 10/6566 429/81 |
| 2015/0037616 | A1 * | 2/2015 | Wyatt ............... | H01M 10/0525 429/7 |
| 2016/0111702 | A1 * | 4/2016 | Ohsumi ................. | B60L 50/64 429/179 |
| 2019/0359071 | A1 * | 11/2019 | Lin ......................... | H01M 2/34 |

* cited by examiner

*Primary Examiner* — Matthew J Merkling

(57) ABSTRACT

A battery of a vehicle includes a housing including: a lower portion that includes a plurality of separators extending vertically upward from a floor of the lower portion; and an upper portion that covers an opening of the lower portion and that is removable from the lower portion. The battery also includes: first and second terminals on the housing; third and fourth terminals on the housing; a plurality of individually housed batteries separated by the plurality of separators; a plurality of switches configured to selectively connect ones of the plurality of batteries to ones of the first, second, third, and fourth terminals; and a battery management module configured to control the plurality of switches.

23 Claims, 9 Drawing Sheets

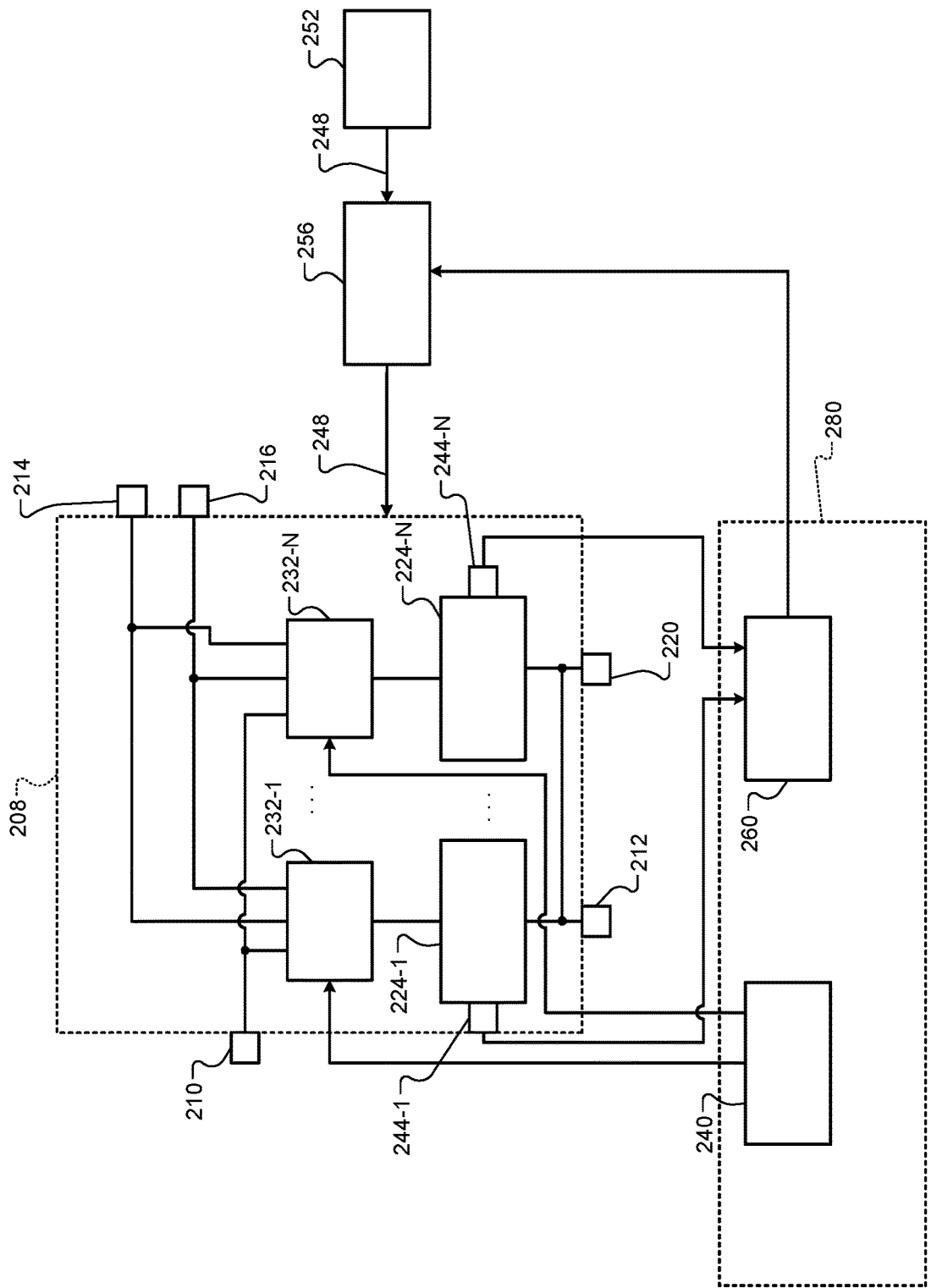

MODULAR VEHICLE BATTERY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to battery systems of vehicles.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a battery of a vehicle includes: a housing including: a lower portion that includes a plurality of separators extending vertically upward from a floor of the lower portion; and an upper portion that covers an opening of the lower portion and that is removable from the lower portion; first and second terminals on the housing; third and fourth terminals on the housing; a plurality of individually housed batteries separated by the plurality of separators; a plurality of switches configured to selectively connect ones of the plurality of batteries to ones of the first, second, third, and fourth terminals; and a battery management module configured to control the plurality of switches.

In further features, the battery management module is electrically connected to the plurality of switches via electrical connectors without soldering of the battery management module to the switches.

In further features, the battery management module is electrically connected to the plurality of switches via electrical connectors without welding of the battery management module to the plurality of switches.

In further features, the individually housed batteries include 12 volt direct current (DC) batteries.

In further features, the plurality of separators extend vertically from the floor of the lower portion to the upper portion.

In further features, the battery includes an opening in the lower portion configured to receive a coolant from a coolant pump.

In further features, the coolant pump is configured to pump the coolant into the battery.

In further features, the coolant is air.

In further features, the coolant is a liquid.

In further features, a temperature control module is configured to control a speed of the coolant pump based on a temperature of the battery.

In further features, the battery management module is attached to the upper portion and is configured to electrically disconnect from the plurality of switches in response to removal of the upper portion from the lower portion.

In further features, the battery management module is separate from the upper portion.

In further features, the plurality of switches are normally open switches and are configured to close in response to signals received from the battery management module while the battery management module is electrically connected to the plurality of switches.

In further features, the plurality of switches are disposed within the lower portion.

In further features, a temperature sensor is configured to measures a temperature between two of the plurality of batteries.

In further features, at least one space between adjacent ones of the plurality of separators is left empty and not occupied by an individually housed battery.

In further features: first and second electrical conductors are electrically connected to the first and second terminals, respectively, and extend vertically away from the first and second terminals; and third and fourth electrical conductors are electrically connected to the plurality of switches and extend vertically upwardly from the floor of the lower portion. The first and second electrical conductors directly contact the third and fourth electrical conductors, respectively, when the upper portion covers the opening of the lower portion.

In further features, the first and second electrical conductors electrically disconnect from the third and fourth electrical conductors, respectively, in response to removal of the upper portion from the lower portion.

In further features, the third and fourth electrical connectors terminate at a point that is vertically below the opening of the lower portion.

In a feature, a starter system of a vehicle includes a battery comprising: a housing including: a lower portion that includes a plurality of separators extending vertically upward from a floor of the lower portion; and an upper portion that covers an opening of the lower portion and that is removable from the lower portion; first and second terminals on the housing; third and fourth terminals on the housing; a plurality of individually housed batteries separated by the plurality of separators; a plurality of switches configured to selectively connect ones of the plurality of batteries to ones of the first, second, third, and fourth terminals; and a battery management module configured to control the plurality of switches. A 12 volt starter motor is configured to draw power from the first and second terminals and is configured to crank an internal combustion engine of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a functional block diagram an example electrical system of a vehicle;

In the drawings, reference numbers may be reused to identify similar and/or identical elements.

DETAILED DESCRIPTION

A vehicle includes a battery having a first output terminals on a housing of the battery for outputting a first operating voltage (e.g., 12 V or 48 V) and second output terminals on the housing for outputting a second operating voltage (e.g., 12 V or 48V). The battery includes a plurality of individually housed batteries and a plurality of switches. A switch control module controls the switches to connect ones of the individual batteries to the first and second output terminals and to provide target capacities and output voltages at the first and second output terminals.

A housing of the batteries includes separators that physically separate the batteries. The separation of the batteries enables coolant flow to heat or cool the batteries. The separation of the batteries may also help one or more of the batteries from being punctured, for example, in the event of an impact.

Figure 1:
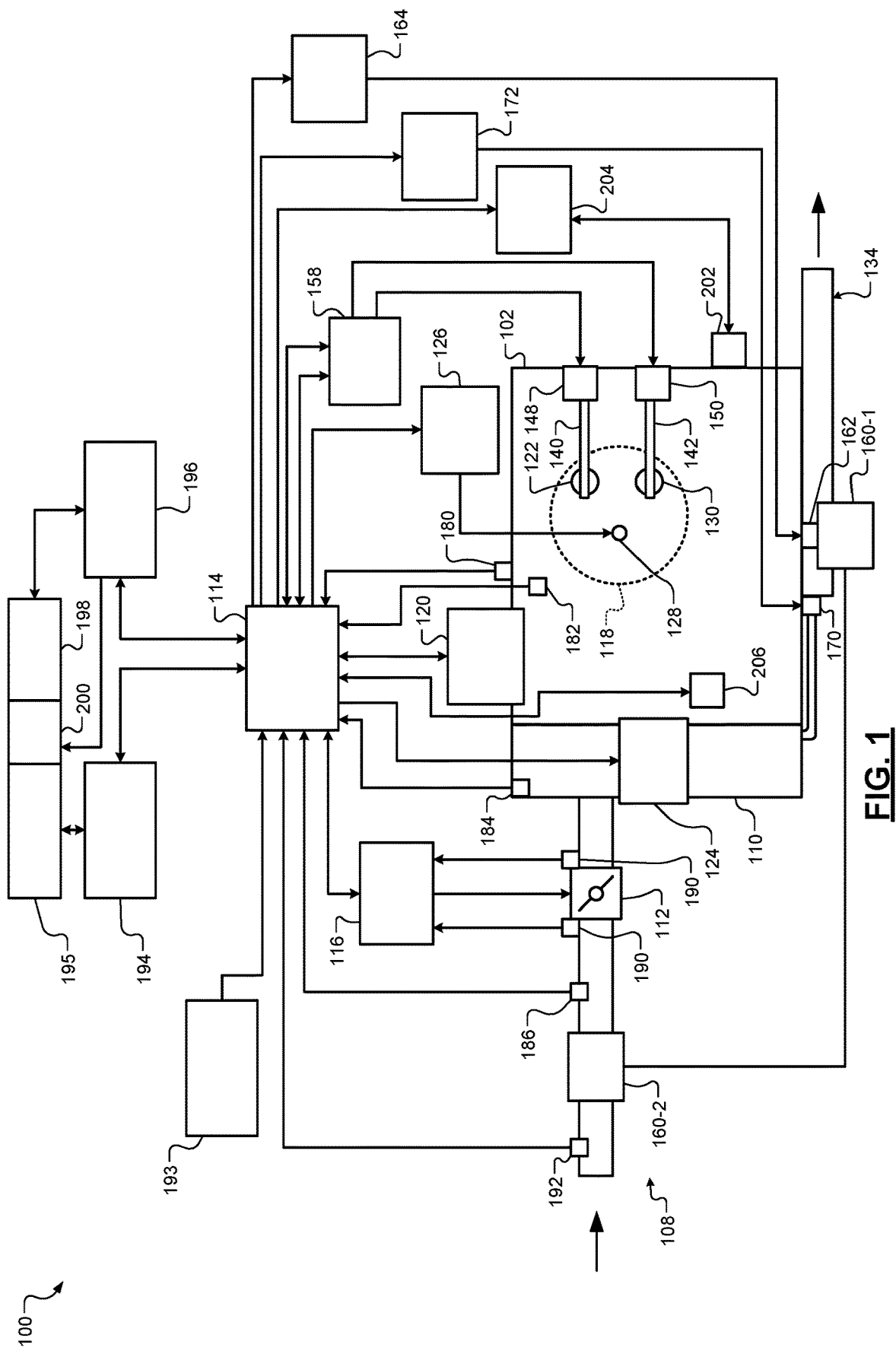
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted.

Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 208 to the electric motor 198 to cause the electric motor 198 to output positive torque. The battery is discussed further below. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not actuating the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the battery 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the battery 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

FIG. 2 is a functional block diagram of an example electrical system of the vehicle. The electrical system includes the battery 208 discussed above.

The battery 208 has two or more different sets of output terminals to provide two or more direct current (DC) operating voltages. Each set of output terminals includes a positive terminal and a negative terminal. Two or more sets of output terminals may share a negative terminal, or the negative terminals of two or more sets may be internally connected within the battery 208 or externally connected. For example only, the battery 208 may have a first positive (e.g., 48 Volt (V)) terminal 210, a first negative terminal 212, a second positive (e.g., a first 12 V) terminal 214, a third positive (e.g., a second 12 V) terminal 216, and a second negative terminal 220. While the example of the battery 208 having a 48 V operating voltage and two 12 V operating voltages is provided, the battery 208 may have one or more other operating voltages, such as only two 12 V operating voltages, only two 48 V operating voltages, two 48 V operating voltages and a 12 V operating voltage, or a combination of two or more other suitable operating voltages.

The battery 208 includes a plurality of individual batteries, such as a first battery 224-1, . . . , and an N-th battery 224-N ("batteries 224"), where N is an integer greater than or equal to 2. In various implementations, N may be equal to 6, 8, 10, or 12. Each of the batteries 224 may include one or more battery cells, and each of the batteries 224 may be separately replaceable within the battery 208. For example only, each of the batteries 224 may be an individually housed 12 V DC battery. The ability to individually replace the batteries 224 may enable the battery 208 to include a shorter warranty period and have a lower warranty cost. The batteries 224 are also individually isolatable, for example, in the event of a fault in a battery module. In various implementations, the battery 208 may have the form factor of a standard automotive grade 12 V battery. In various implementations, portions of the batteries 224 may be implemented in housings located at different locations within the vehicle. For example, a first housing including a first portion of the batteries 224 may be located near a front end of the vehicle and a second housing including a second portion of the batteries 224 may be located near a rear end of the vehicle. While the example of two housings and two portions of the batteries 224 is provided, more than two housings and portions of the batteries 224 may be implemented.

Each of the batteries 224 has its own separate capacity (e.g., in amp hours, Ah). The battery 208 includes a plurality of switches, such as first switches 232-1, . . . , N-th switches 232-N (collectively "switches 232"). The switches 232 enable the batteries 224 to be connected in series, parallel, or combinations of series and parallel to provide desired output voltages and capacities at the output terminals.

A switch control module 240 controls the switches 232 to provide desired output voltages and capacities at the output terminals. The switch control module 240 controls the switches 232 to vary the capacity provided at the output terminals based on a present operating mode of the vehicle, as discussed further below.

The battery 208 also includes a plurality of temperature sensors, such as a first temperature sensor 244-1, . . . , and N-th temperature sensor 244-N (collectively "temperature sensors 244"). The temperature sensors 244 measure temperatures at various locations within the battery 208. For example, one temperature sensor may be provided to measure the temperature of each of the batteries 224. For example only, the first temperature sensor 244-1 may measure a first temperature of the first battery 224-1, . . . , and the N-th temperature sensor 244-N may measure an N-th temperature of the N-th battery 224-N. The switch control module 240 and the temperature control module 260 may be implemented, for example, in a battery management module 280. The switches 232 may also be implemented in the battery management module 280.

As discussed further below, the batteries 224 are separated such that a coolant 248 can flow between the batteries 224 within the housing of the battery 208 to heat or cool the batteries 224. The coolant 248 can also flow around the batteries 224. A heater and/or a cooler 252 may warm or cool the coolant 248. A temperature control module 260 controls a pump 256 and heating or cooling provided by the heater and/or cooler 252 based on the temperatures measured by the temperature sensors 244. For example, the temperature control module 260 may control the pump 256 and heating or cooling provided by the heater and/or cooler 252, for example, to maintain the temperatures at, above, or below one or more target temperatures. The coolant 248 can be a liquid or a gas (e.g., air).

Figure 3A:
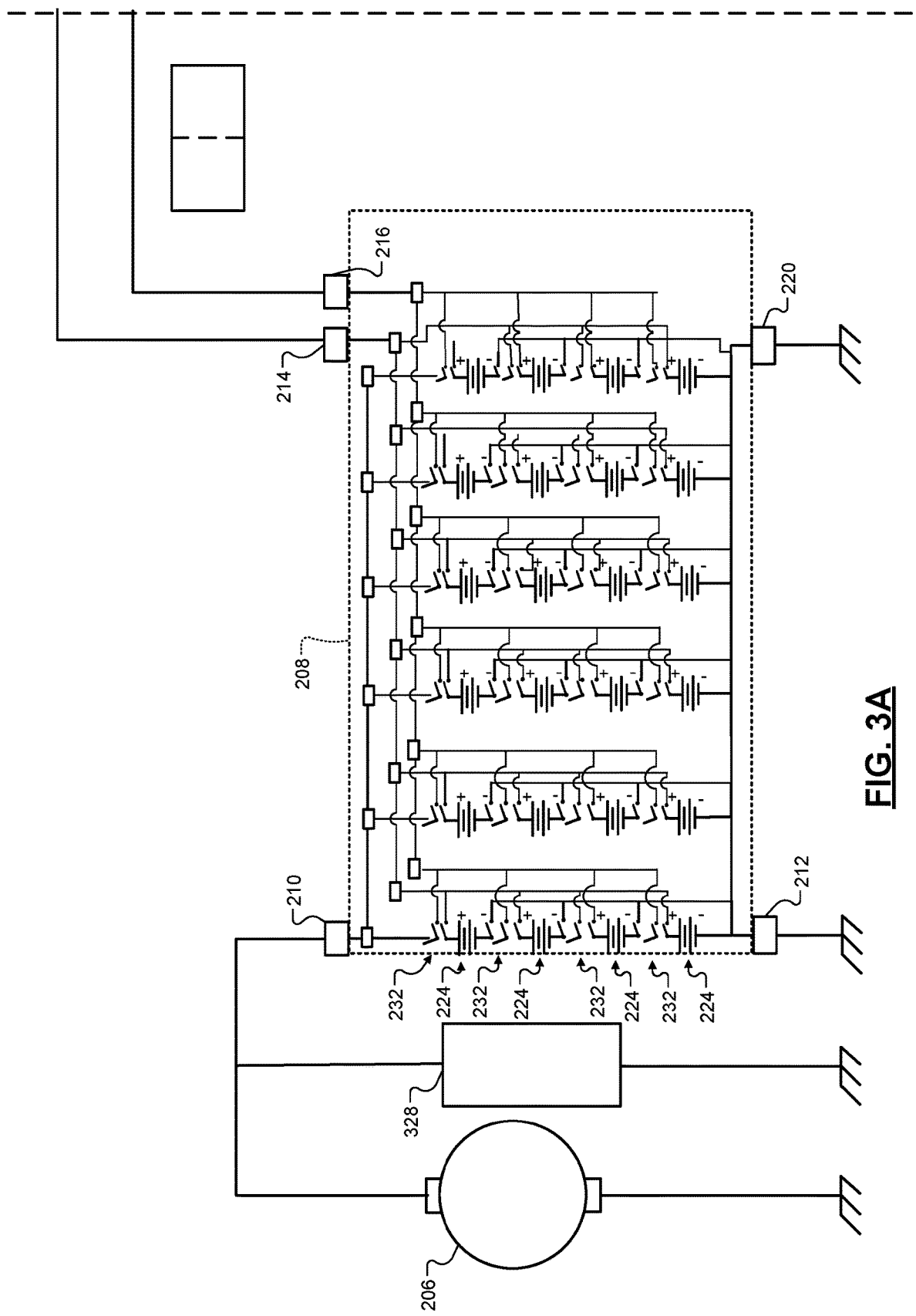
FIGS. 3A-3B are a schematic including an example implementation of a battery.
Figure 3B:
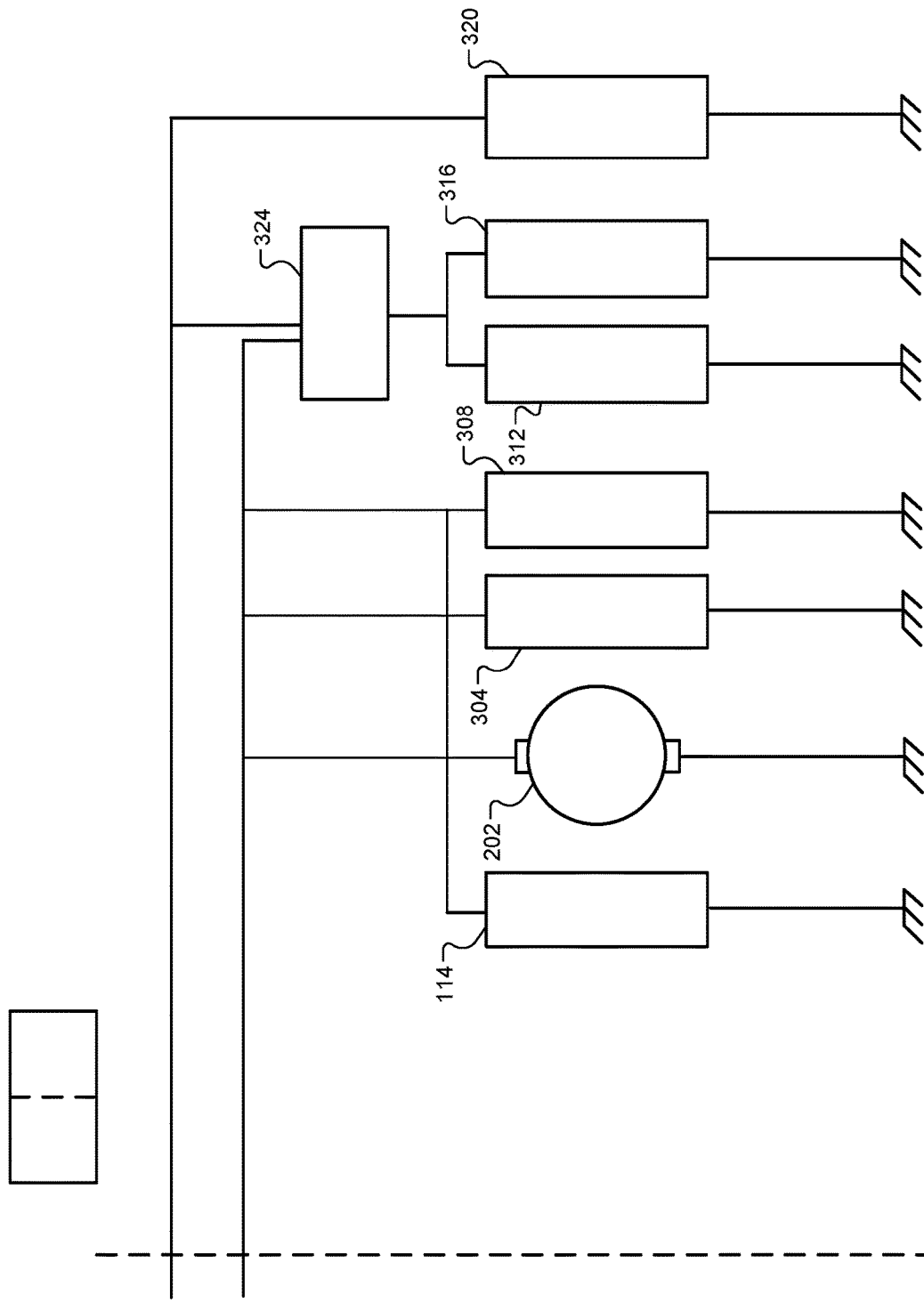

FIGS. 3A-3B are a schematic including an example implementation of the battery 208. In the example of FIG. 3A, sets of 4 of the batteries 224 (e.g., 12 V batteries) are connectable in series (via ones of the switches 232) to the first positive terminal 210 and the first negative terminal 212 to provide a first output voltage (e.g., 48 V). Individual ones of the batteries 224 can be connected (via ones of the switches 232) to the second positive terminal 214 or the third positive terminal 216 and the second negative terminal 220 to provide a second output voltage (e.g., 12 V) at the second and third positive terminals 214 and 216. How many of the batteries 224 are connected to the first positive terminal 210, the second positive terminal 214, and the third positive terminal 216 dictates the portions of the overall capacity of the battery 208 available at each of the positive terminals.

As shown in FIG. 3B, a first set of vehicle electrical components operates using one of the two or more operating voltages of the battery 208. For example, the first set of vehicle electrical components may be connected to the second and third positive terminals 214 and 216. Some of the first set of vehicle electrical components may be connected to the second positive terminal 214, and some of the first set of vehicle electrical components may be connected to the third positive terminal 216. The first set of vehicle electrical components may include, for example but not limited to, the ECM 114 and other control modules of the vehicle (e.g., the battery management module 280), the starter motor 202, and/or other electrical loads, such as first 12 V loads 304 (e.g., the pump 256), second 12 V loads 308, other control modules 312, third 12 V loads 316, and fourth 12 V loads 320. In various implementations, a switching device 324 may be connected to both of the first and second positive terminals 214. The switching device 324 may connect the other control modules 312 and the third 12 V loads 316 to the second positive terminal 214 or the third positive terminal 216.

As shown in FIG. 3A, a second set of vehicle electrical components operates using another one of the two or more operating voltages of the battery 208. For example, the second set of vehicle electrical components may be connected to the first positive terminal 210. The second set of vehicle electrical components may include, for example but not limited to, the generator 206 and various electrical loads, such as 48 V loads 328. The generator 206 may be controlled to recharge the battery 208.

Each of the switches 232 may be an insulated gate bipolar transistor (IGBT), a field effect transistor (FET), such as a metal oxide semiconductor FET (MOSFET), or another suitable type of switch. The switches 232 can be actuated, for example, to discharge energy from the batteries 224 to various loads when an event occurs, such as an impact or a communication failure. This may enable compliance with an automotive safety integrity level (ASIL) standard, such as the ASIL-D standard.

Figure 4:
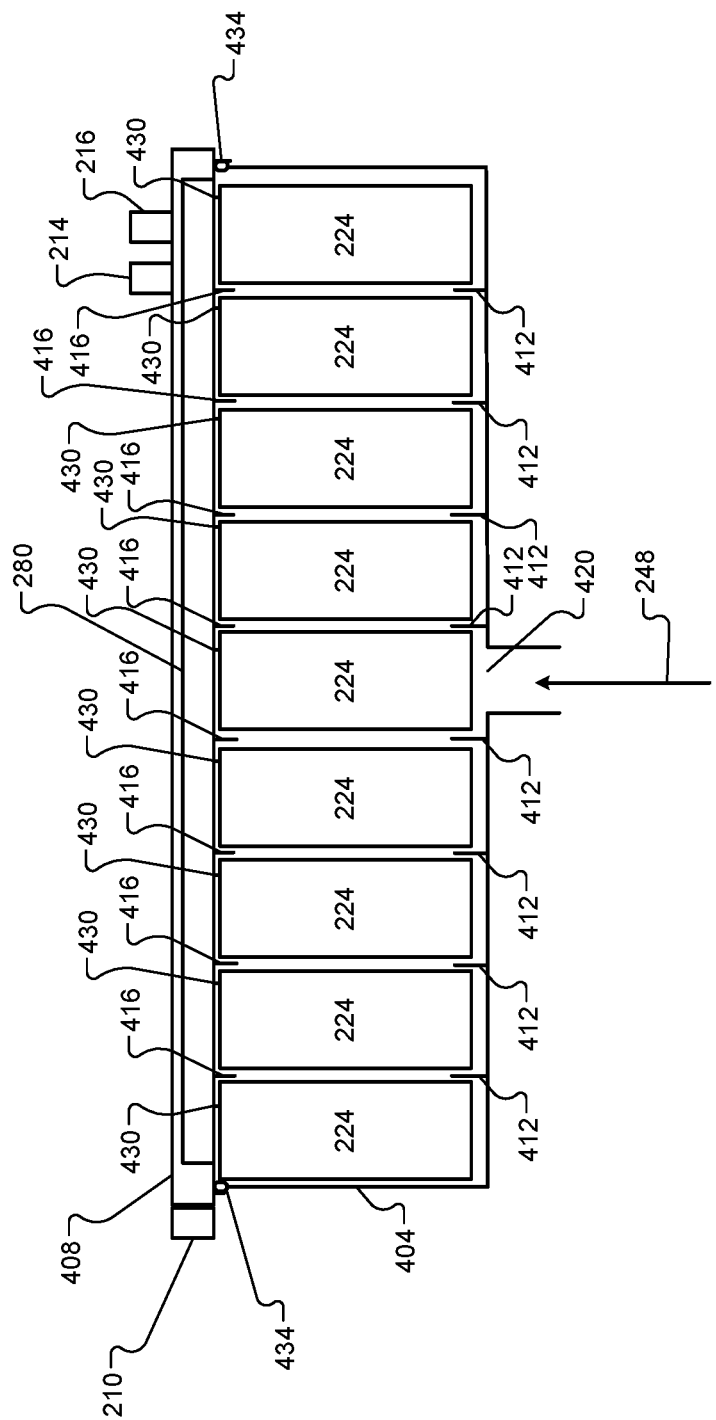
FIGS. 4-6 are side cross-section view of example implementations of the battery.

FIG. 4 includes a side cross-section view of an example implementation of the battery 208. The battery 208 includes a base (lower) portion 404 and a lid (upper) portion 408. The batteries 224 sit within the base portion 404. The base portion 404 includes separators 412 that separate adjacent ones of the batteries 224. The separation of the batteries 224 may help prevent one or more of the batteries 224 from being punctured, for example, when the battery 208 is impacted. In various implementations, as shown in FIG. 4, the lid portion 408 may also include separators 416.

The separation between the batteries 224 also allows for the coolant 248 to flow between the batteries 224 to heat or cool the batteries 224. As shown in FIG. 4, the battery 208 includes an opening 420, such as in the base portion 404, through which the coolant 248 flows into the battery 208. In various implementations, the batteries 224 may include legs that maintain the batteries 224 above a floor (or bottom) surface of the base portion 404 to allow the coolant 248 to flow under the batteries 224. The base portion 404 may also include hold downs configured to hold feet formed on the legs of the batteries 224 to the floor surface of the base portion.

Figure 5:
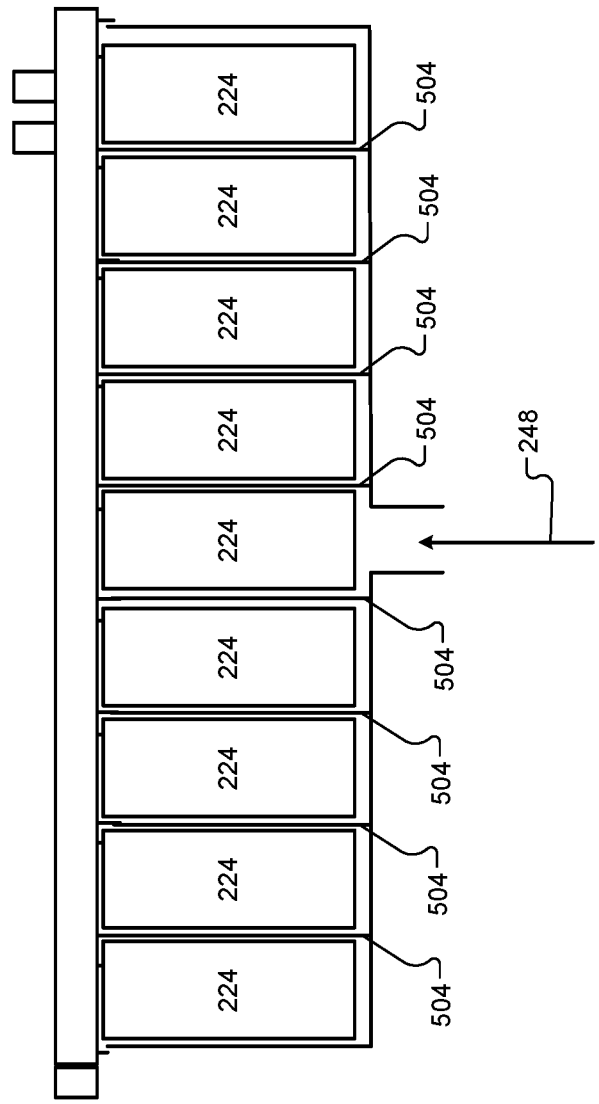

As shown in FIG. 5, the separators may take the form of walls 504 that extend from the floor of the base portion 404 to top surface of the base portion 404 or to a lower surface of the lid portion 408. The walls 504 may include openings that allow the coolant 248 to flow through the walls 504 and between the batteries 224.

Figure 6:
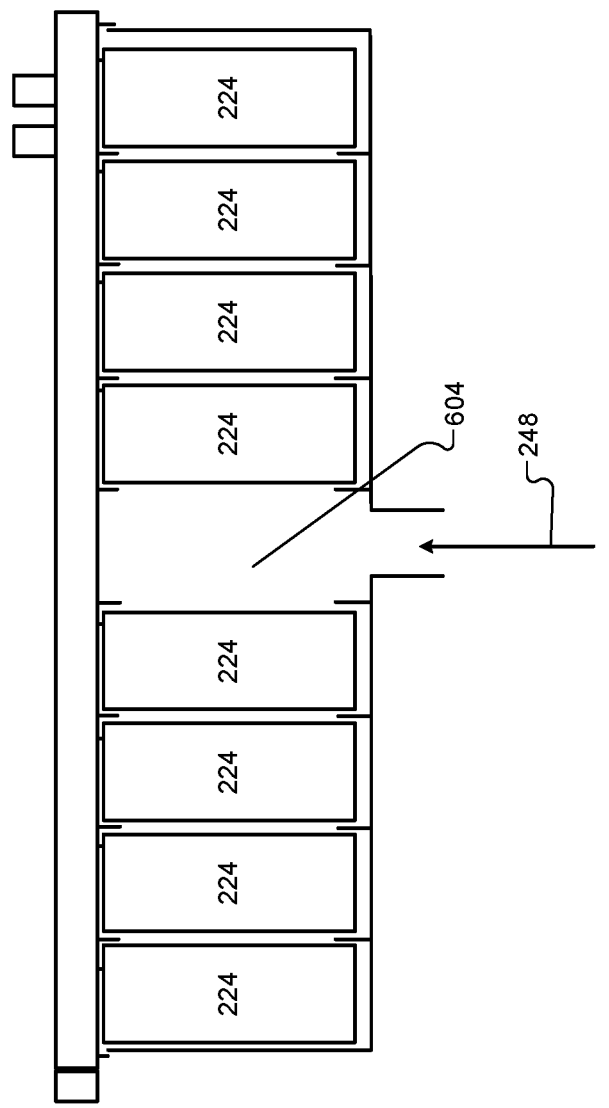

As shown in FIG. 6, one or more of the spaces for the batteries 224 may be left empty 604, for example, to facilitate flow of the coolant 248 through the battery 208. Alternatively, a structure that is not a battery may be provided in an empty space, for example, to aid in the event of an impact and/or the help facilitate the flow of the coolant 248.

The above provides scalability, flexibility, and redundancy such that the battery 208 can be configured for different vehicles and for different situations. Also, the batteries 224 can be isolated and/or discharged, for example, in response to an impact of the battery 208 or a fault in one or more of the batteries 224.

Referring again to FIG. 4, the battery management module 280 is configured to be electrically connected to the batteries 224 and/or the switches 232 via electrical connectors 430. The battery management module 280 is also configured to be separable from the batteries 224. For example, the battery management module 280 may be configured to be electrically connected and disconnected from the electrical connectors 430 without soldering and unsoldering, welding and unwelding, etc. For example, the electrical connectors 430 may be quick connect/disconnect type electrical connector, such as crimp terminals or another suitable type of electrical connector.

As shown in FIG. 4, the battery management module 280 may be implemented in or attached to the lid portion 408 and may be electrically disconnectable via removal of the lid portion 408 from the base portion 404 of the battery 208. Alternatively, the battery management module 280 may be separate from the lid portion 408 and may be electrically disconnectable from the batteries 224 via removal of the battery management module 280 from the base portion 404. In various implementations, a liquid seal 434 may be implemented to seal an interface between the base portion 404 and the lid portion 408. The liquid seal 434 may include, for example, one or more gaskets and/or O-rings.

Figure 7:
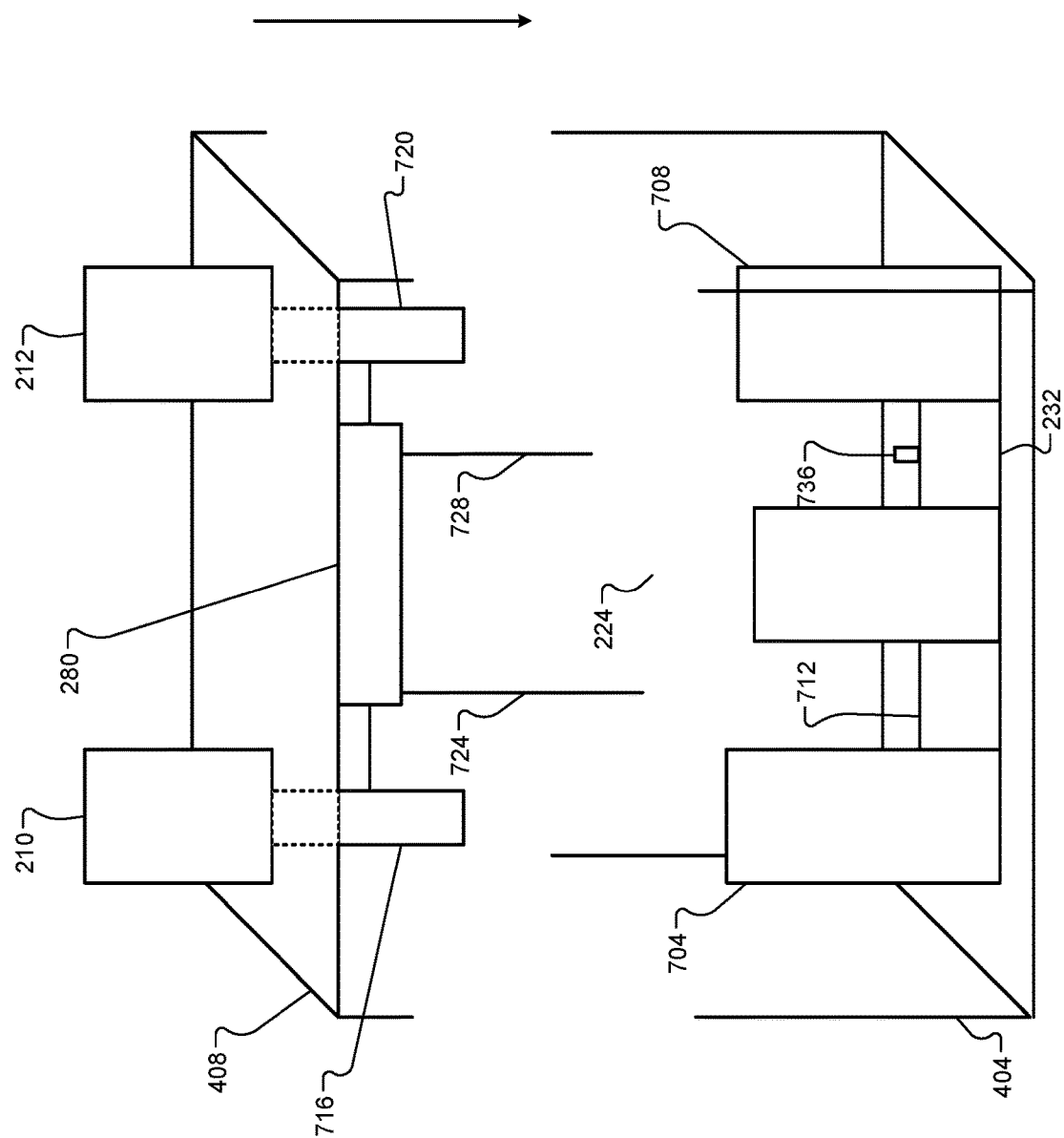
FIGS. 7 and 8 are side views of an example portion of the battery.

FIG. 7 is a side view of an example portion of the battery 208. The batteries 224 are connected to positive and negative electrical conductors 704 and 708, such as bus bars, via shunts 712 and the switches 232. The first positive terminal 210 and the first negative terminal 212 are also connected to positive and negative electrical conductors 716 and 720 that are attached to the lid portion 408. The battery management module 280 may also be attached to the lid portion 408, as discussed above. When the lid portion 408 is fit on top of the base portion 404 and covers the top opening in the base portion 404, the positive and negative electrical conductors 704 and 708 contact the positive and negative electrical conductors 716 and 720, thereby creating an electrical connection.

When the lid portion 408 is fit on top of the base portion 404, sense connections (or locations of sensing) are also created and control connections are also created between the switches 232 and the battery management module 280. For example, temperature sensor probes 724 of the temperature sensors 244 may extend from the battery management module 280 to the batteries 224 when the lid portion 408 is fit on top of the base portion 404. Electrical conductors 728 that carry control signals from the battery management module 280 to the switches 232 may also connect to the switches 232 via connectors 736 when the lid portion 408 is fit on top of the base portion 404.

The battery management module 280 is therefore removable from the switches 232 and the batteries 224. The batteries 224 can be kept from overcharging during shipping and installation. In various implementations, the positive and negative conductors 704 and 708 may end below a top surface of the base portion 404. Current may be measured using a current sensor, for example, at the shunts 712, or via the positive or negative electrical conductor 704 or 708.

In various implementations, the switches 232 may remain open until the battery management module 280 is electrically connected with the batteries 224 and the switches 232 and the battery management module 280 has completed an authentication routine. The authentication routine may include verification of electrochemical characteristics of the batteries 224 and other suitable authentication functions. Once the authentication routine has successfully passed, the battery management module 280 may selectively close ones of the switches 232. If a connection between the battery management module 280 and one of the batteries 224 or one of the sensors of the one of the batteries 224, the switches 232 may automatically open and electrically isolate that one of the batteries 224.

In various implementations, one or more of the sensors (e.g., the temperature sensors 244) may be located in one or more connectors that are installed into the battery 208. Alternatively, the sensors (e.g., the temperature sensors 244) may be located in the battery 208 (e.g., the base portion 404) and may communicate with the battery management module 280 via an installed electrical connector.

In various implementations, in addition to communicating their data directly to the battery management module 280, the sensors of the battery 208 may serially communicate their data to the battery management module 280 via electrical connection of the battery management module 280 to positive and negative terminals of the battery 208 (e.g., the first positive terminal 210, the second positive terminal 214, or the third positive terminal 216 and the first negative terminal 212 or the second negative terminal 220. This may provide a redundant communication path between the sensors and the battery management module 280. The redundant communication path could be utilized, for example, in response to a loss of direct communication between the sensors and the battery management module 280.

In various implementations, in addition to communicating their data directly to the battery management module 280, the sensors of the battery 208 may serially communicate their data to the battery management module 280 via radio frequency (RF) communication. For example, RF transceivers associated groups of one or more of the batteries 224 (and the associated ones of the sensors) may transmit data to a RF transceiver of the battery management module 280. This may provide a redundant communication path between the sensors and the battery management module 280. The redundant communication path could be utilized, for example, in response to a loss of direct communication between the sensors and the battery management module 280.

In various implementations, current may be measured within the battery 208 both at a high side (e.g., the first positive terminal 210, the second positive terminal 214, and the third positive terminal 216) and at a low side (e.g., the first negative terminal 212 and the second negative terminal 220). This may enable the battery management module 280 to rationalize the current measurements. This may also eliminate the need for one or more external current sensors and/or an intelligent battery system (IBS), thereby reducing cost.

Figure 8:
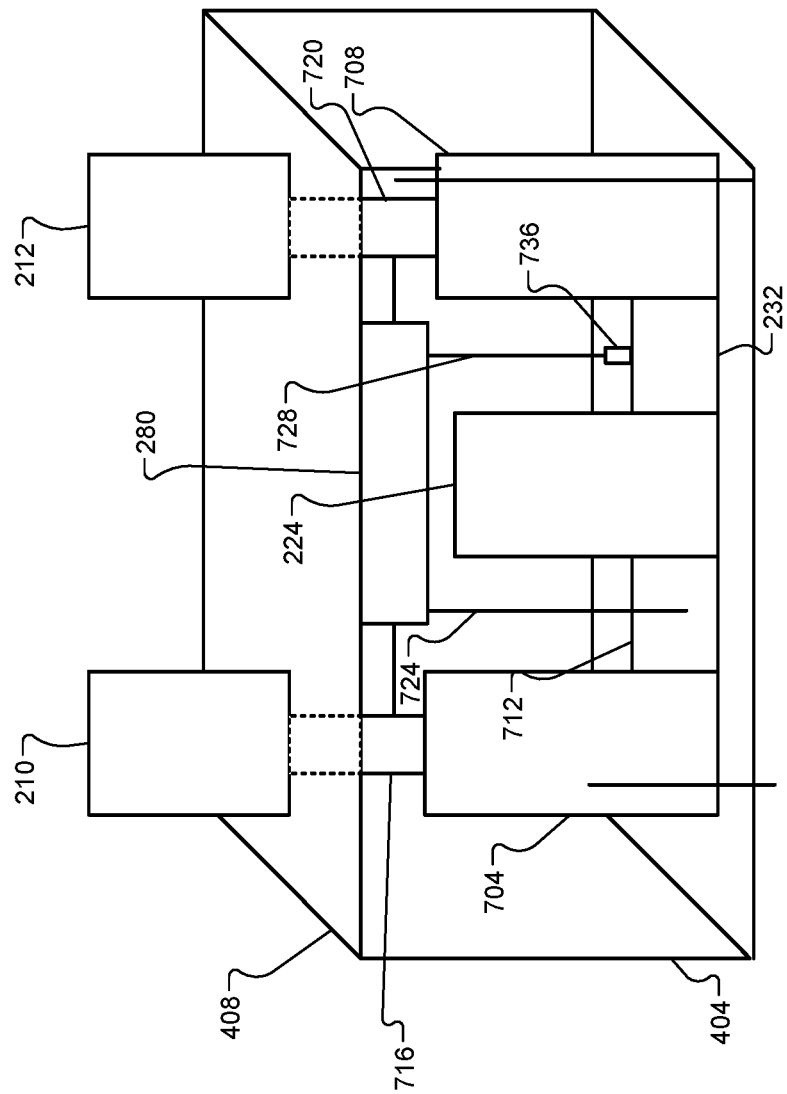

While the example of the connection to the first positive terminal 210 and the first negative terminal 212 is shown and discussed in the example of FIGS. 7 and 8, the example of FIGS. 7 and 8 are additionally or alternatively applicable to the connection to the second positive terminal 214, the third positive terminal 216, and the second negative terminal 220.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A battery, comprising:
a housing including:
  a lower portion that includes a plurality of separators extending vertically upward from a floor of the lower portion; and
  an upper portion that covers an opening of the lower portion and that is removable from the lower portion;
first and second terminals on the housing;
third and fourth terminals on the housing;
a plurality of individually housed batteries separated by the plurality of separators;
a plurality of switches configured to selectively and individually connect and disconnect ones of the plurality of batteries to and from ones of the first, second, third, and fourth terminals; and
a battery management module configured to control the plurality of switches.

2. The battery of claim 1 wherein the battery management module is electrically connected to the plurality of switches via electrical connectors without soldering of the battery management module to the switches.

3. The battery of claim 1 wherein the battery management module is electrically connected to the plurality of switches via electrical connectors without welding of the battery management module to the plurality of switches.

4. The battery of claim 1 wherein the individually housed batteries include 12 volt direct current (DC) batteries.

5. The battery of claim 1 wherein the plurality of separators extend vertically from the floor of the lower portion to the upper portion.

6. The battery of claim 1 further comprising an opening in the lower portion configured to receive a coolant from a coolant pump.

7. A battery system comprising:
the battery of claim 6; and
the coolant pump, wherein the coolant pump is configured to pump the coolant into the battery.

8. The battery system of claim 7 wherein the coolant is air.

9. The battery system of claim 7 wherein the coolant is a liquid.

10. The battery system of claim 7 further comprising a temperature control module configured to control a speed of the coolant pump based on a temperature of the battery.

11. The battery of claim 1 wherein the battery management module is attached to the upper portion and is configured to electrically disconnect from the plurality of switches in response to removal of the upper portion from the lower portion.

12. The battery of claim 1 wherein the battery management module is separate from the upper portion.

13. The battery of claim 1 wherein the plurality of switches are normally open switches and are configured to close in response to signals received from the battery management module while the battery management module is electrically connected to the plurality of switches.

14. The battery of claim 1 wherein the plurality of switches are disposed within the lower portion.

15. The battery of claim 1 further comprising a temperature sensor is configured to measure a temperature between two of the plurality of batteries.

16. The battery of claim 1 wherein at least one space between adjacent ones of the plurality of separators is left empty and not occupied by an individually housed battery.

17. The battery of claim 1 further comprising:
first and second electrical conductors that are electrically connected to the first and second terminals, respectively, and that extend vertically away from the first and second terminals; and
third and fourth electrical conductors that are electrically connected to the plurality of switches and that extend vertically upwardly from the floor of the lower portion, wherein the first and second electrical conductors directly contact the third and fourth electrical conductors, respectively, when the upper portion covers the opening of the lower portion.

18. The battery of claim 17 wherein the first and second electrical conductors electrically disconnect from the third and fourth electrical conductors, respectively, in response to removal of the upper portion from the lower portion.

19. The battery of claim 17 wherein the third and fourth electrical connectors terminate at a point that is vertically below the opening of the lower portion.

20. A starter system, comprising:
a battery comprising:
  a housing including:
    a lower portion that includes a plurality of separators extending vertically upward from a floor of the lower portion; and
    an upper portion that covers an opening of the lower portion and that is removable from the lower portion;
  first and second terminals on the housing;
  third and fourth terminals on the housing;
  a plurality of individually housed batteries separated by the plurality of separators;
  a plurality of switches configured to selectively and individually connect and disconnect ones of the plurality of batteries to and from ones of the first, second, third, and fourth terminals; and
  a battery management module configured to control the plurality of switches; and
a 12 volt starter motor is configured to draw power from the first and second terminals and that is configured to crank an internal combustion engine.

21. A battery, comprising:
a housing including:
  a lower portion that includes a plurality of separators extending vertically upward from a floor of the lower portion; and
  an upper portion that covers an opening of the lower portion and that is removable from the lower portion;
first and second terminals on the housing;
a plurality of individually housed batteries separated by the plurality of separators,
wherein the individually housed batteries are 12 volt direct current (DC) batteries;
a plurality of switches configured to selectively and individually connect and disconnect ones of the plurality of batteries to ones of the first and second terminals; and
a battery management module configured to control the plurality of switches.

22. The battery of claim 21 wherein:
the housing further includes a third terminal on the housing; and
the plurality of switches are configured to connect one of the batteries to and from ones of the first, second, and third terminals.

23. A vehicle including:
the battery of claim 21.

* * * * *